United States Patent [19]

Griffith

[11] 4,256,971

[45] Mar. 17, 1981

[54] WAVE AND WIND MOTION ENERGY TRANSDUCER

[76] Inventor: Rodney Griffith, 6905 E. Ocean Blvd., Long Beach, Calif. 90803

[21] Appl. No.: 95,509

[22] Filed: Nov. 16, 1979

[51] Int. Cl.³ ............................................. F03B 13/12
[52] U.S. Cl. ....................................... 290/53; 290/42; 417/332
[58] Field of Search ............... 290/53, 42, 43; 114/39; 115/4; 417/330, 331, 332, 333

[56] References Cited

U.S. PATENT DOCUMENTS

| 1,682,176 | 8/1928 | Hegenbarth | 115/4 |
| 3,231,749 | 4/1963 | Hinck | 290/53 |
| 3,774,048 | 11/1973 | Hardingham | 290/42 |

*Primary Examiner*—J. V. Truhe
*Assistant Examiner*—D. L. Rebsch
*Attorney, Agent, or Firm*—Fulwider, Patton, Rieber, Lee & Utecht

[57] ABSTRACT

At least two spaced apart eccentric weights are rotatably mounted about vertical axles. The weights are coupled to advance a drive mechanism in a single direction when the weights move about their respective axles in either direction of rotation. The drive mechanism is coupled to a flywheel mounted upon a vertical axle and rotatable therewith. The transducer may be mounted athwartship in a floating vessel or supported on a mast or other support which is subjected to wind or wave motion. The eccentric weights oscillate irregularly about their axles under the influence of the rolling and pitching motion imparted by wind or waves. The motion of the eccentric weights thereby drives the flywheel in a single direction to provide useful power.

7 Claims, 5 Drawing Figures

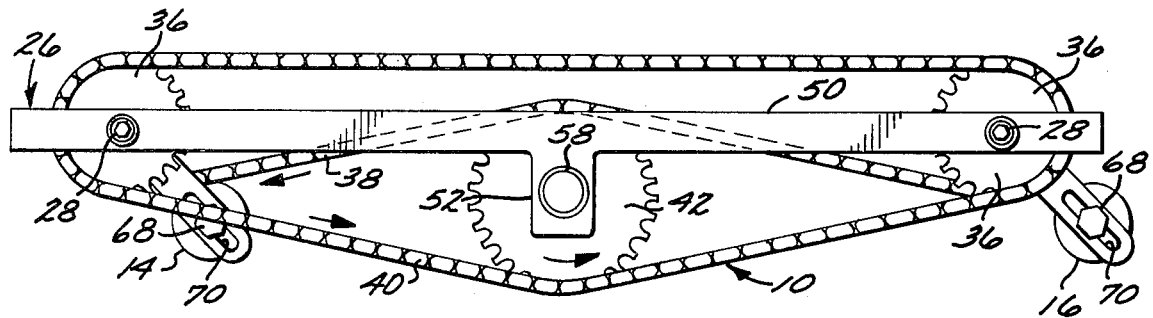
FIG. 1
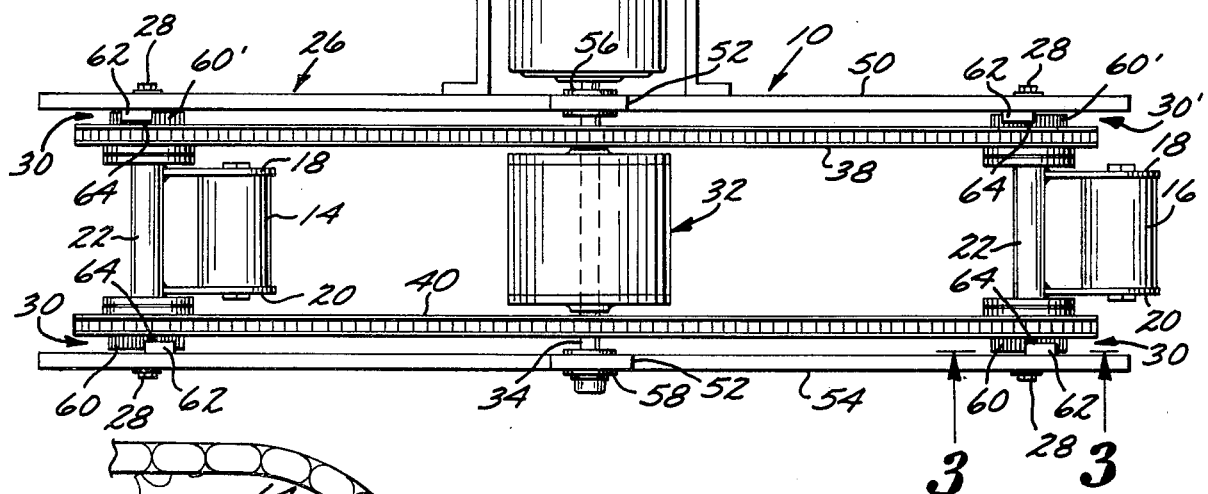
FIG. 2
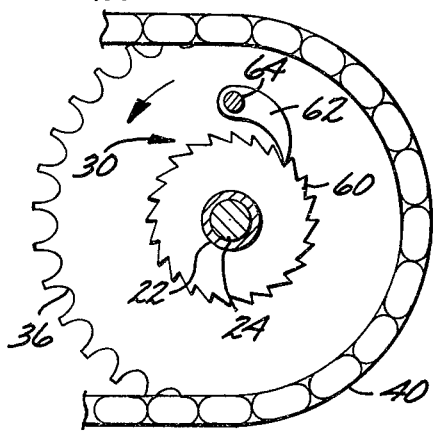
FIG. 3
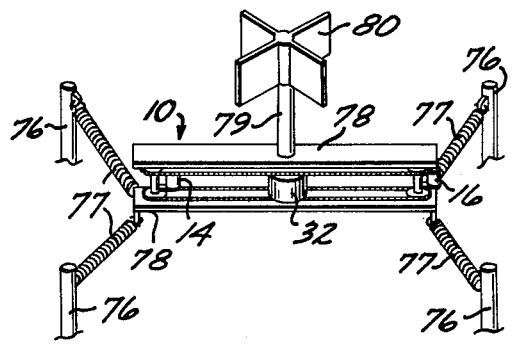
FIG. 4
FIG. 5

WAVE AND WIND MOTION ENERGY TRANSDUCER

FIELD OF THE INVENTION

The present invention relates to devices for extracting useful power from wind and wave energy.

DESCRIPTION OF THE PRIOR ART

In the past, various mechanisms have been employed to harness the power of wind and waves which ceaselessly expend energy, but with very little transformation of that power to a form useful for performing the tasks desired by humanity. The development of devices for extraction of energy from wind and wave motion has lagged far behind the development of other energy resources, even though wind and wave energy is, for all intents and purposes, a renewable and unceasing energy source.

Some work has been done in the field of wave motion energy extraction, but the devices developed to data have had only a minor commercial significance. Most wind energy transducers that have been developed respond directly to the velocity of the wind. As a consequence, when wind velocity is quite low, the conventional devices are of very little use. The present invention, on the other hand, responds to changes in fluid velocity. As a consequence, the present invention is able to extract wind energy from wind of only a slight velocity, if, as is usually the case, the velocity of the wind varies moment by moment.

Attempts have been made to extract wave energy in water through mechanisms which are responsive to the shifting disposition of a floating vessel that is subjected to wave action. For example, U.S. Pat. No. 3,774,048 is directed to a device for transforming the pitching and rolling motion of a marine structure into useful energy. This device involves a single eccentrically weighted driving device mounted about a vertical axle and geared to an energy takeoff mechanism. The driving force is applied in a single direction although the eccentrically weighted driving device rotates in alternate directions. The entire mechanism is positioned at a single location near the center of the vessel. U.S. Pat. No. 1,682,176 describes another system in which an eccentrically weighted rotor travels upon a circular track extending transversely across a vessel to drive a vertical shaft passing through the center of the vessel. Both of these devices, although responding to the pitching and rolling motion of a boat, fail to extract a significant amount of the available energy from this motion.

SUMMARY OF THE INVENTION

The present invention employs a plurality of laterally spaced apart eccentric weights which are mounted for rotation upon vertical drive axles. Although the eccentric weights move upon their associated vertical drive axles in both clockwise and counterclockwise rotation, they are coupled to rotate a flywheel and flywheel shaft in a single direction of rotation. When used as a wave motion transducer, eccentric weights of the invention are located at laterally spaced apart positions near the periphery of a vessel or floating structure on opposite sides of the center of gravity thereof. When so positioned, the eccentric weights of the invention extract a considerable amount of energy from the pitching and rolling motion of the floating structure in the water. By positioning the eccentric weights opposite each other near the periphery of the floating device, the eccentric weights are subjected to far greater rates of change of motion then are similar eccentric weights which are rotated about an axle located near the center of a vessel. This is because the vessel, as it pitches and rolls, tends to rotate about its own center of gravity. The locations on the vessel which are furthest from the center of gravity experience the greatest angular momentum, and hence the greatest change in angular momentum with the rolling and pitching movement. By positioning the eccentric weights about axles located near the periphery, the present invention is able to extract considerably more energy from wave motion as contrasted with prior art devices of the type described.

A further advantage of the present invention is that the movement of the plurality of eccentric weights creates a condition in which the movement of the weights is accentuated by the moment of the other weights. This increases rotation of all of the weights about their respective drive axles. For example, when the transducer of the invention is mounted upon a pole or mast and held aloft exposed to the wind with the rotatable eccentric weights spaced laterally apart, the action of wind upon vanes affixed to the pole tends to flex the pole. With the flexing movement, the weights rotate about their associated axles. The device thus extracts useful energy from the change in position of the eccentric weights. Moreover, as the weights move, they further flex the pole or mast to accentuate the movement thereof. This increases the rotation of the weights, and hence the amount of energy extracted.

The transducer of the invention may be used as a major source of commercial electrical power in both urban and rural environments. The invention may also be used as a transportable power supply in both large and small boats, on off shore oil drilling platforms, and also in campers and other recreational vehicles. The transducer of the invention may be utilized as either a primary power source, or as an auxiliary power source to supply supplemental power.

The invention may be explained with greater clarity and facility by reference to the accompanying drawings.

DESCRIPTION OF THE DRAWINGS

FIG. 1 is a bottom plan view of a motion transducer according to the invention.

FIG. 2 is a side elevational view of the motion transducer of FIG. 1.

FIG. 3 is a sectional detail taken along the lines 3—3 of FIG. 2.

FIG. 4 illustrates diagrammatically the installation of the motion transducer in a floating vessel.

FIG. 5 illustrates diagrammatically the invention mounted on a mast and exposed to the wind.

DESCRIPTION OF THE EMBODIMENT

FIGS. 1 and 2 illustrate an energy transducer 10 constructed according to the present invention. The transducer 10 includes two laterally spaced apart generally cylindrical shaped lead weights 14 and 16, each carried at a distance from an associated drive axle between laterally disposed upper and lower flat steel bars 18 and 20. The bars 18 and 20 are suspended in cantilever fashion from generally vertical steel sleeves 22, and are welded thereto at their inboard ends. The sleeves 22 are rotatable and coaxial about generally vertical drive axles 24, one of which is depicted in section in FIG. 3. The axles 24 are held in position in a steel framework 26 by means of hexagon headed fastening machine screws 28.

Clutch mechanisms 30 and 30', one of which is depicted in detail in FIG. 3, are engageable by the eccentric weights 14 and 16 through the sleeves 22 as the weights rotate in either a counterclockwise or clockwise direction. A generally cylindrical lead flywheel 32 is coupled for rotation with a vertical flywheel axle or shaft 34, also carried in the framework 26 at its center. Drive linkage, including sprockets 36 mounted at both ends of the vertical drive axles 24 and chain loops 38 and 40 drive upper and lower sprockets 42 that are secured upon the flywheel axle 34. The clutch mechanisms 30 and 30' operate to engage the sprockets 36 only to advance each of the chain loops 38 and 40 in a single direction, as indicated by the directional indicia associated therewith in FIGS. 1 and 3. The chain loops 38 and 40 transfer the unidirectional motion imparted thereto to the flywheel axle 34. This rotates the flywheel 32 and the flywheel axle 34 in a single direction of rotation. A power takeoff in the form of an electrical generator 44 is provided to convert the mechanical rotational movement of the axle 34 to the electrical power at the electrical leads 46.

The steel frame 26 includes an elongated flat sheet metal bar 50 with a laterally extending perpendicular tab 52 at its center. The bar 50 forms the upper framework support, and an identical bar 54, illustrated in FIG. 1 and congruent therewith and spaced vertically therebelow forms a lower support. The bars 50 and 54 are spaced from each other by the vertical drive axles 24 which are secured thereto and fixed therebetween as depicted in FIG. 2. The vertical drive axles 24 are solid cylindrical steel rods tapped at both ends to receive the threaded shanks of the hexagonal headed screws 28. The vertical flywheel axle 34 is rotatable relative to the frame 26 and is carried within annular bearings 56 and 58.

The sleeves 22 to which the eccentrically mounted weights 14 and 16 are attached are carried by bearings for rotation about the vertical drive axles 24. Each of the sleeves 22 carries a pair of annular ratchet wheels 60 and 60' one of which is depicted in a plan view in FIG. 3. Each ratchet wheel interacts with a restraining pawl or tooth 62 which is spring biased inwardly toward the vertical drive axle 24 associated therewith. Together, the ratchet wheels 60 and 60' and the pawls 62 form the clutch mechanisms 30 and 30'. Each of the clutch mechanisms 30 and 30' is similar in design and construction to clutch mechanisms as conventionally utilized in bicycles. The vertical drive sleeves 22 and sprockets 36 may likewise be constructed of bicycle parts.

A single clutch mechanism 30 is depicted in FIG. 3. The ratchet wheel 60 is keyed, splined or otherwise securely attached to the sleeve 22 to rotate therewith. The sprocket 36 on the other hand, is journaled for rotation about the sleeve 22, unless engaged by the pawl 62 for rotation therewith. The pawl 62 is mounted for rotation relative to the sprocket 36 upon a mounting pin 64 extending from the face of the sprocket 36 parallel to the axial alignment of the sleeve 22 and in co-planar arrangement with a ratchet wheel 60 or 60'. The pawl 62 is biased toward the ratchet wheel 60 or 60' by a spring mechanism, not shown.

The arrangement of the teeth on the ratchet wheel 60 of the clutch mechanism 30 depicted in FIG. 3 is such that the teeth are directed radially outwardly with a counterclockwise inclination. Accordingly, the pawl 62 will engage the sprocket 36 to rotate with the sleeve 22 only when the sleeve 22 carries the ratchet wheel 60 in a counterclockwise direction. This will occur only when the eccentric weight 16 rotates in a counterclockwise direction as viewed in FIG. 1. Counterclockwise rotation of either sprocket 36 in either clutch mechanism 30 will advance the chain loop 40 in a counterclockwise direction as viewed in FIG. 1. When the weight 16 rotates in clockwise fashion about the vertical drive axle 24, it carries the sleeve 22 and ratchet wheel 60 therewith. When the ratchet wheel 60 is rotated in this fashion, the pawl 62 ratchets over the teeth thereof and the sprocket 36 is disengaged from the sleeve 22.

The clutch mechanism 30 depicted in FIG. 3 is the clutch mechanism that is located adjacent to and disposed inwardly from the bottom bar 54 of the support frame 26 at both of the vertical drive axles 24 associated with both of the eccentric weights 14 and 16. A clutch mechanism 30' with a ratchet wheel having teeth of opposite disposition is located at the other end of each vertical drive axle 24 near the top bar 50 of the frame 26. That is, instead of the radially outwardly and counterclockwise inclined teeth of the ratchet wheel 60 as depicted in FIG. 3, the clutch mechanism 30' (FIG. 2) includes a ratchet wheel with teeth that are disposed radially outwardly and inclined clockwise in opposite disposition to the teeth of the ratchet wheel 60. Accordingly, the clutch mechanisms 30' will engage sleeves 22 and sprockets 36 at the upper ends of the vertical drive axles 24 to advance the chain loop 38 in a clockwise direction of rotation, as viewed in FIG. 1 only when one or both of the eccentric weights 14 or 16 rotate clockwise about an associated vertical drive axle 24.

When the eccentric weight 16 moves in rotation about its vertical drive axle 24, it will at any point in time, engage one and only one of the sprockets 36 located at opposite ends of the axle 24. When the eccentric weight 16 moves in counterclockwise fashion about the vertical drive axle 24, it will carry the sprocket 36 at the lower end of the vertical drive axle 24 adjacent the bar 54 to advance the chain loop 40 in a counterclockwise direction. Conversely, when the weight 16 moves in clockwise fashion about the vertical drive axle 24, it will engage only the sprocket 36 located adjacent to the upper bar 50 to advance the chain loop 38 in a clockwise direction, as viewed in FIG. 1. With reference to FIG. 1, it is apparent that whether either of the flywheel sprockets 42 are driven by the chain loop 38 or by the chain loop 40, the flywheel axle 34 and flywheel 32 will in both cases be driven in counterclockwise rotation. This unidirectional driving arrangement is effectuated by the tangential engagement of the chain loops 38 and 40 on opposite sides of the flywheel axle 34 with a sprocket 42 associated therewith.

The driving engagement of the eccentric weight 14 is identical to that of the eccentric weight 16, and the clutch mechanisms 30 and 30' associated therewith are as previously described in association with the vertical drive axle 24 of the eccentric weight 16.

The chain loops 38 and 40 are constructed of sequentially connected steel links with interstitial spaces between links designed to receive the teeth of the sprockets 38 and 42. Such endless chains are typically used in bicycle drive mechanisms.

The flywheel 32 need not necessarily by cylindrical, but is constructed with a heavy weight which is not eccentric, but is balanced evenly about the flywheel axle 34. A protective cage 66 houses the generator 44 and the generator casing is rigidly secured to the cage 66. The generator 44 includes a rotor which is mounted upon an extension of the flywheel axle 34 and driven by rotation of the flywheel axle 34 and flywheel 32. The flywheel 32 is rigidly coupled to rotate with the flywheel axle 34. The purpose of the flywheel 32 is to make the rotation of the flywheel axle 34 as uniform as possible. The rotor of the generator 44 rotates within stator windings so that electrical power is generated and is drawn off for use by the generator outlet leads 46, as depicted in FIG. 2.

The ideal mass and the optimum position of the eccentric weights 14 and 16 from the vertical drive axles 24 will vary according to the size of the structure upon which the transducer 10 is mounted, the wave period or steadiness of the wind, and the height of the waves or wind strength. Accordingly, the weights 14 and 16 are not permanently secured to the laterally extending bars 18 and 20, but rather are mounted on releasable fasteners, such as the machine bolts 68 depicted in FIGS. 1 and 2. The bars 18 and 20 include longitudinal slots 70 so that the weights 14 and 16 can be adjusted radially relative to the vertical drive axles 24 to alter the angular moment of the rotation of the eccentric weights 14 and 16 thereabout. The machine screws 68 need merely be loosened to allow the weights 14 and 16 to be moved radially within the slots 70 to a desired location. The screws 68 are then tightened at a distance from the vertical drive axles 24 to achieve the desired moment of the eccentric weight thereabout. In this fashion the degree of eccentricity of the weights 14 and 16 is adjustable. The distance at which the weights 14 and 16 are positioned along the longitudinal slots 70 is governed by the height of the swells to which the transducer is subjected, and the mass of the weights 14 and 16. For large power installations it is advantageous to include a servo drive mechanism for moving the weights 14 and 16 along the slots 70. This servo mechanism may be either manually controlled or computer controlled so that with changing swell conditions the radial positions of the weights 14 and 16 may be adjusted automatically.

FIG. 4 illustrates the positioning of the energy transducer 10 in a floating structure, illustrated as the hull 72 of a boat. The vertical drive axles carry the eccentric weights 14 and 16 within the framework 26 near the lateral periphery of the port and starboard sides of the boat hull 72 on opposite sides of the center of gravity 73 of the hull 12. As waves progress through the water 74, the boat hull 72 will heel to the port or starboard side, and will also pitch and yaw from bow to stern. The framework 26 is rigidly secured to the structure of the hull 72. The eccentric weights 14 and 16 will move in arcuate paths, not necessarily in the same direction at the same time, and typically in irregular oscillating patterns with the wave motion. As the eccentric weights 14 and 16 move, they drive one or the other of the sprockets 36 associated therewith to advance either the chain loop 38 or the chain loop 40 in the directions indicated by the directional arrows in FIG. 1. This rotates the upper or lower sprocket 42 coupled to the flywheel axle 34 to generate electricity in the generator 44. Since the rolling motion and pitching of the boat hull 72 is virtually continuous as long as the hull 72 floats in the water 74, a continuous source of useable power is provided.

The transducer 10 of the invention may well dictate an alternative manner of anchoring the vessel upon which it is mounted. In conventional practice, a boat or other vessel is anchored by chains or other lines that are cleated to the deck of the vessel. To increase the rocking action of the vessel in order to maximize the power output from the transducer 10 it may well be preferable to attach the anchor lines to the keel of the vessel at swivel connections. With the swell action this will increase the rolling and pitching movement of the vessel considerably so as to increase the power output of the invention. Additional anchor lines can be attached to the deck of the vessel to control the rolling and pitching motion as desired.

FIG. 5 illustrates the transducer 10 of the invention mounted at some arbitrary elevation suspended between poles or masts 76. The poles 76 are upright and are located diagonally outward from the corners of the transducer 10. Coil springs 77 extend laterally diagonally to each corner of the transducer 10 from the poles 76 and are attached to the transducer 10 by means of brackets 78. Atop the transducer 10 there is an upright stanchion 79 with a plurality of flat, solid, sheet-like vanes 80, mounted in perpendicular alignment to extend outwardly at 90° intervals. When the wind blows, regardless of direction, it will impinge upon at least some of the vanes 80. This causes the transducer 10 to flex and rock elastically in the wind, relative to the poles 76 as restrained by the coil springs 77 so that the eccentric weights 14 and 16 rotate about their axles and turn the flywheel 32 in the manner previously described. As with the utilization of the device in a structure floating in water, the oscillatory movement of the eccentric weights 14 and 16 may be irregular. The eccentric weights 14 and 16 may even turn in complete circles for a time, although more typically they irregularly advance in first one direction of rotation, and then in the opposite direction.

It is to be understood that numerous forms of a power takeoff may be employed. That is, in place of the generator 44, the energy developed by rotation of the flywheel shaft 34 may be transmitted as mechanical rotatory motion to any type of power takeoff, such as a propellor shaft, for example. Any conventional type of power takeoff may be utilized.

It should further be understood that the orientation of the vertical drive axles 24 and the flywheel axle 34 deviates from a true vertical direction by the extent to which the transducer 10 is rocked or tilted. The description of the axles as being vertically aligned is intended to refer to a generally upright orientation and should not be limited to strict vertical alignment. Indeed, it is necessary to the operation of the device for the alignment to vary back and forth from the vertical.

Undoubtedly, numerous other modifications of the invention and various implementations thereof beyond those depicted and described in detail in connection herewith will occur to those familiar with wind and wave energy extraction devices. Accordingly, the scope of the invention should not be construed as limited to the specific embodiment depicted, nor to the mounting arrangements depicted and described. Rather, the necessary features and scope of the invention are as set forth in claims appended hereto.

I claim:

1. An energy transducer comprising a plurality of laterally spaced apart eccentric weights mounted for rotation upon vertical drive axles, a flywheel coupled for rotation with a vertical flywheel shaft, interconnecting drive linkage means, for driving said flywheel in response to movement of said eccentric weights, and clutch means engageable by said eccentric weights as said weights rotate in either direction to advance said drive linkage means to rotate said flywheel and said flywheel shaft in a single direction of rotation.

2. An energy transducer according to claim 1 mounted in a floating structure.

3. An energy transducer according to claim 2 further characterized in that said vertical drive axles are located near the lateral periphery of said floating structure and on opposite sides of the center of gravity thereof.

4. An energy transducer according to claim 1 further characterized in that said flywheel axle is coupled to drive an electrical generator.

5. An energy transducer according to claim 1 further characterized in that the degree of eccentricity of the mass of said eccentric weights relative to said vertical drive axles is adjustable.

6. An energy transducer according to claim 1 further characterized in that said drive axles and said flywheel axle are carried in a rigid framework which is supported in a flowing fluid upon an upright support which responds elastically to changes in fluid motion.

7. An energy transducer according to claim 6 further characterized in that said transducer is pole mounted in the air and exposed to the wind.

* * * * *